(12) United States Patent
Weiland

(10) Patent No.: US 6,754,604 B2
(45) Date of Patent: Jun. 22, 2004

(54) METHOD AND APPARATUS FOR DIAGNOSING FUEL INJECTORS

(75) Inventor: David B. Weiland, Union City, CA (US)

(73) Assignee: Snap-On Incorporated, Pleasant Prairie, WI (US)

(*) Notice: Subject to any disclaimer, the term of this patent is extended or adjusted under 35 U.S.C. 154(b) by 82 days.

(21) Appl. No.: 10/285,694

(22) Filed: Nov. 1, 2002

(65) Prior Publication Data

US 2004/0088130 A1 May 6, 2004

(51) Int. Cl.$^7$ ............................................. G01M 15/00
(52) U.S. Cl. ................................ 702/114; 73/119 A
(58) Field of Search ................................ 702/114, 183; 73/119 A; 123/490, 305

(56) References Cited

U.S. PATENT DOCUMENTS

| | | | |
|---|---|---|---|
| 3,828,247 A | | 8/1974 | Kirsch et al. |
| 3,875,792 A | * | 4/1975 | Krohn et al. ............. 73/119 A |
| 4,989,150 A | * | 1/1991 | Tazawa ....................... 701/101 |
| 5,107,426 A | * | 4/1992 | McGinty et al. ............... 701/29 |
| 5,172,588 A | | 12/1992 | Umemoto |
| 5,203,868 A | * | 4/1993 | Ono ......................... 73/119 A |
| 5,535,621 A | * | 7/1996 | Glidewell et al. ......... 73/119 A |
| 5,804,970 A | * | 9/1998 | Villa et al. .................... 324/379 |
| 6,120,005 A | * | 9/2000 | Wright ..................... 251/129.1 |
| 6,260,412 B1 | * | 7/2001 | Pool et al. ................. 73/119 A |
| 6,668,633 B2 | * | 12/2003 | Hart et al. ................. 73/119 A |

FOREIGN PATENT DOCUMENTS

DE       19738967 A1       3/1999

* cited by examiner

Primary Examiner—John Barlow
Assistant Examiner—Toan M. Le
(74) Attorney, Agent, or Firm—McDermott, Will & Emery

(57) ABSTRACT

A tester for conveniently diagnosing the fuel injectors of an internal combustion engine is described. The fuel injector includes an injector coil that is charged during an energizing period. The tester calculates the difference between two sample signals obtained during the energizing period. The tester determines a first operational status of the injector based on this difference, and a second operational status based on the level of at least one of the sampled signals.

18 Claims, 8 Drawing Sheets

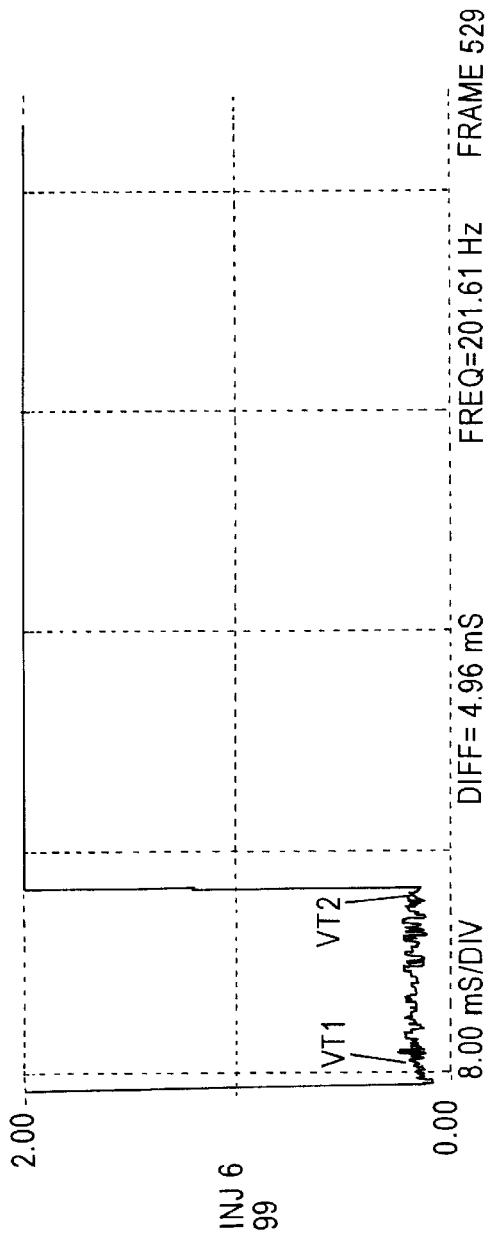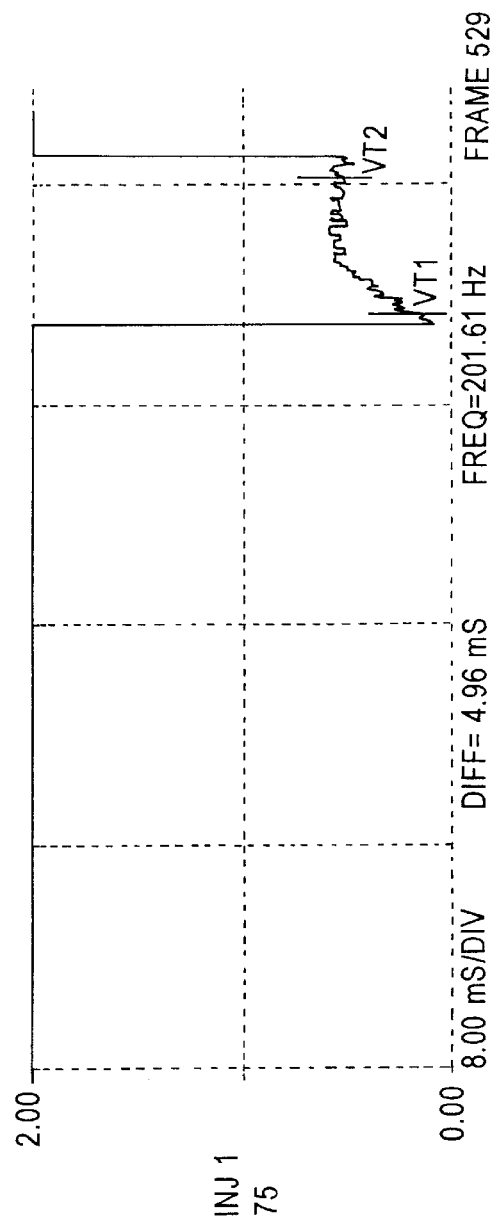

US 6,754,604 B2

METHOD AND APPARATUS FOR DIAGNOSING FUEL INJECTORS

FIELD OF THE DISCLOSURE

The disclosure generally relates to a method and apparatus for determining operational status of a coil, and more specifically, to a fault detection method and apparatus for evaluating fuel injectors having an injector coil based on signals obtained during the operations thereof.

BACKGROUND

An internal combustion engine employs various numbers of fuel injectors for supplying fuels. Electronic fuel injectors are the most commonly used fuel injectors for non-diesel engines. An electronic fuel injector may include a plurality of electromagnetically actuated fuel injection valves that are sequentially charged with a determinable quantity of fuel during a fuel metering interval and which during a subsequent interval are caused to inject fuel into the engine.

FIG. 1 is an exemplary circuit for controlling the operation of a fuel injector. An injector coil 10, such as a solenoid coil, is disposed associating with each injection valve, and is used to control the opening/closing thereof. The injector coil 10 is coupled to a voltage source 12 on one end and to a switch 14 on the other end. The switch 14 controls the coupling of the injector coil 10 to the ground. The on/off of the switch is controlled by a controller or processor, such as a PCM (powertrain control module), ECU (electronic control unit), or ECM (electronic control module).

The injector coil 10 is controlled in such a way to cause the injector coil to activate or pull in a movable member, such as a pintle, that is disposed on the injection valves. When the switch 14 is closed, a current flows through the injector coil. The current energizes the injector coil, or, produces a magnetic field, that activates the pintle on one of the injection valves to allow fuel to be injected through a valve opening into the combustion chamber of a cylinder. When switch 14 is open, no current flows through the injector coil 10. The pintle thus returns to its original position and closes the injector valve.

There is a need to evaluate the health of the injectors. There is another need to detect faulty injectors automatically. There is also a need for an easy and convenient process to determine the operation of fuel injectors without using cumbersome current probes.

SUMMARY

This disclosure describes a method and apparatus for conveniently diagnosing fuel injectors having an injector coil and a power source that charges the injector coil during an energizing period. An exemplary tester monitors signals from the fuel injectors. The tester diagnoses the fuel injectors based on the monitored signals. The tester includes a data port for receiving signals, a data storage device, and a data processing unit coupled to the data port and the data storage device. The data storage device bears instructions to cause the tester upon execution of the instructions by the data processing unit to receive a first signal representing a first energizing state of the injector coil during the energizing period and a second signal representing a second energizing state of the injector coil during the energizing period. The data processing unit then determines a first operational status of the injector based on a level difference between the first energizing state and the second energizing state.

In one aspect, the first and second signals represent voltages of the injector coil during a period that the voltage source sends current to the injector coil. The signals may be obtained before or during the conduction of the diagnosis of the injector. The signals may be stored in the data storage device and accessible by the data processing unit. The data processing unit calculates a difference between the first and second signal, and determines whether the difference falls between a predetermined range. If the difference is outside the predetermined range, the tester indicates that the injector coil has a high resistance.

Optionally, the tester may be further configured to determine a second operational status of the injector based on levels of at least one of the first energizing state and the second energizing state. For instance, the data processing unit may access data representing injector voltages obtained during the time that the voltage source sends current to the injector coil, and determines whether the injector voltage is lower than a threshold voltage, for example, a voltage near zero volt. If the injector voltage is higher than the threshold voltage, the tester indicates that the injector coil having an unacceptable resistance. For example, the tester may indicate the injector coil as shorted or partially shorted.

BRIEF DESCRIPTION OF THE DRAWINGS

The present disclosure is illustrated by way of example, and not by way of limitation, in the figures of the accompanying drawings and in which like reference numerals refer to similar elements and in which:

FIGS. 4a and 4b are injector voltage waveforms obtained from two injectors, one has normal resistance, while the other has a resistance higher than that of a normal injector;

DETAILED DESCRIPTION OF ILLUSTRATIVE EMBODIMENTS

In the following description, for the purposes of explanation, numerous specific details are set forth in order to provide a thorough understanding of the present disclosure. It will be apparent, however, to one skilled in the art that the present disclosure may be practiced without these specific details. In other instances, well-known structures and devices are shown in block diagram form in order to avoid unnecessarily obscuring the present disclosure.

An exemplary tester for conveniently diagnosing injectors having an injector coil is disclosed. The tester determines various operational statuses of the injector based on signals generated thereby. One of the signals used by the tester is the voltage of the injector coil relative to the ground. FIG. 2 shows a waveform of the signal displayed on an oscilloscope under a large scale, such as a 50 volt scale. The injector coil voltage represents the energizing status of the injector coil, and may be measured at any point between the injector coil and the switch, or at any other equivalent points that are known to people skilled in the art to determine the energizing status of the injector coil. For example, the voltage waveform of FIG. 2 is obtained from point A in FIG. 1.

Figure 1:
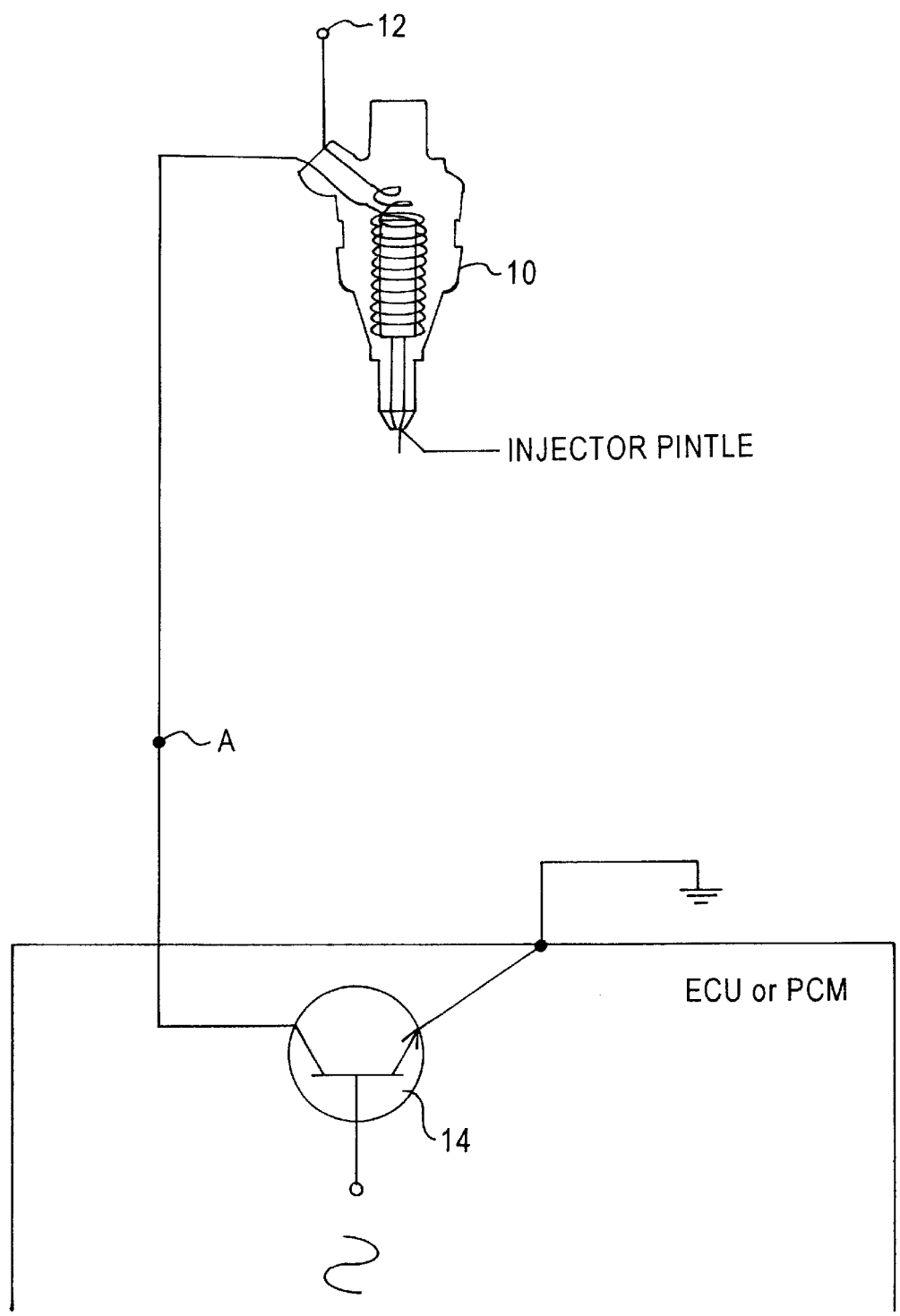
FIG. 1 is an exemplary circuit for controlling the operation of a fuel injector.
Figure 2:
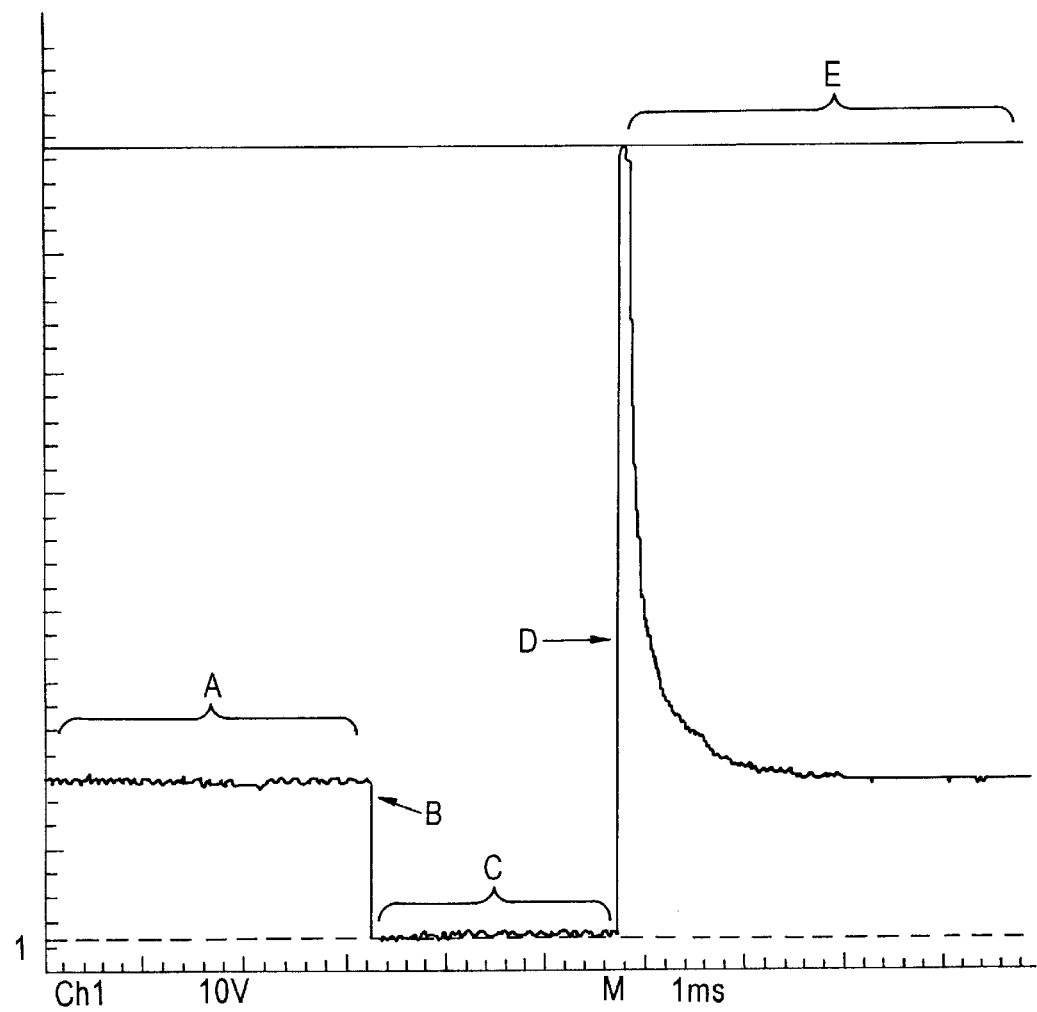
FIG. 2 shows a waveform of the voltage of an injector coil relative to the ground displayed on an oscilloscope under a large scale.

Operations of a fuel injector can be understood by referring to FIGS. 1 and 2. The waveform in FIG. 2 includes five zones: zone A, B, C, D and E, although zones B and D cover only a very short period of time. In zone A, switch 14 is open and no current flows through injector coil 10. The measured injector voltage is about the same as that of voltage source 12. In zone B, a control signal from the ECU or PCM closes switch 14, which pulls the injector voltage to near ground. Current starts to flow through injector coil 10 and voltage source 12 starts to energize injector coil 10. The current flowing through injector coil 10 increases steadily in zone C and approaches a saturated current level. The current passing through injector coil 10 builds up sufficient magnetic field to activate standard the pintle on an injection valve to allow fuel to be injected through a valve opening into the combustion chamber of a cylinder. Zone C is usually referred to as the energizing period.

In zone D, a control signal from the controller or data processor opens switch 14. Current stops flowing through injector coil 10. The magnetic field built by the injector coil thus collapses. Energy built up in injector coil 10 is released as a voltage pulse inductive kick exceeding the level of voltage source 12. At this point, the magnetic field weakens and is no longer sufficient to activate the pintle. In zone E, the pintle is released. The mechanical movement of the pintle relative to the coil causes the voltage hump in zone E.

The waveform shown in FIG. 2 is observed using a large voltage scale ranging from 0–75 volts. Under such observation scale, when injector coil 10 is being energized in zone C, the injector voltage appears to be constant. However, when the waveform is observed in a microscopic scale, such as around 0.00 volt to 2.00 volt level, the waveform in zone C shows different characteristics.

Figure 3:
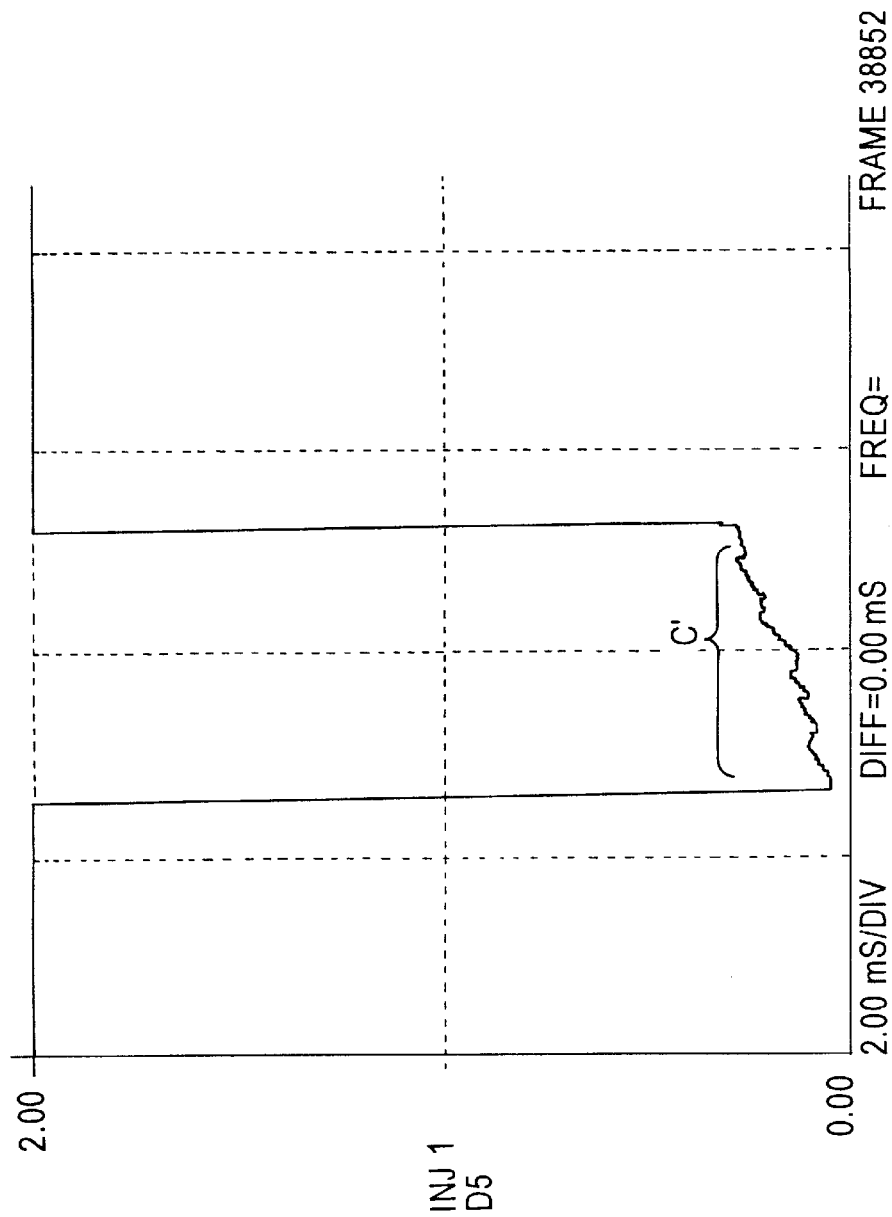
FIG. 3 depicts the same injector voltage shown in FIG. 2, but under a microscopic scale.

FIG. 3 shows a waveform of the same injector voltage as shown in FIG. 2, but under a microscopic scale. Signals larger than 2.0V are clipped. Zone C' in FIG. 3 is comparable to zone C of FIG. 2, which corresponds to the injector voltage when the injector coil is being energized. Although zone C in FIG. 1 shows a nearly constant voltage level, zone C' in FIG. 3, on the other hand, shows that the injector voltage in fact changes with time when the injector coil is being energized. The tester determines the operational status of the injector based on characteristics of the injector voltage obtained when the injector is being energized.

FIGS. 4a and 4b depict injector voltage waveforms obtained from two injectors from the same vehicle respectively. The injector of FIG. 4a has a high resistance, while the injector of FIG. 4b is normal. Two sample voltages, VT1 and VT2, are obtained during a period when the injector coil is being energized. In one embodiment, VT1 is sampled within 200 ms after the injector coil starts being energized, and VT2 is sampled within 200 ms before the injector coil stops being energized. The voltage difference between VT2 and VT1 is defined as "$\Delta V$."

It is observed that the injector voltage for the high resistance injector (FIG. 4a) has little or no $\Delta V$ during the period when the injector coil is energized. On the other hand, the injector voltage for the normal injector (FIG. 4b) has a $\Delta V$ at about 0.50 volts. Thus, the tester can determine whether the injector has a normal or high resistance based on the value of $\Delta V$.

The tester receives voltage signals from the injector by means of a signal probe coupled thereto and determines $\Delta V$ for the injector accordingly. In order to determine whether the injector has a normal resistance, the tester determines if $\Delta V$ of the injector falls within a predetermined voltage range corresponding to the vehicle model or injector type under test. The predetermined voltage range corresponding to each vehicle model and/or injector type can be obtained empirically. The value ranges can be stored in a data storage device of the tester. For example, a predetermined voltage range from 0.15 volt to 0.85 volt may be used for vehicles having 10–20$\Omega$ injectors. If $\Delta V$ is outside the range, the data processing unit determines that the injector under test has an abnormal injector. On the other hand, if $\Delta V$ falls within the predetermined voltage range, the data processing unit indicates that the injector resistance may be acceptable. The determination result may be sent to a monitor for display.

Figure 5A:
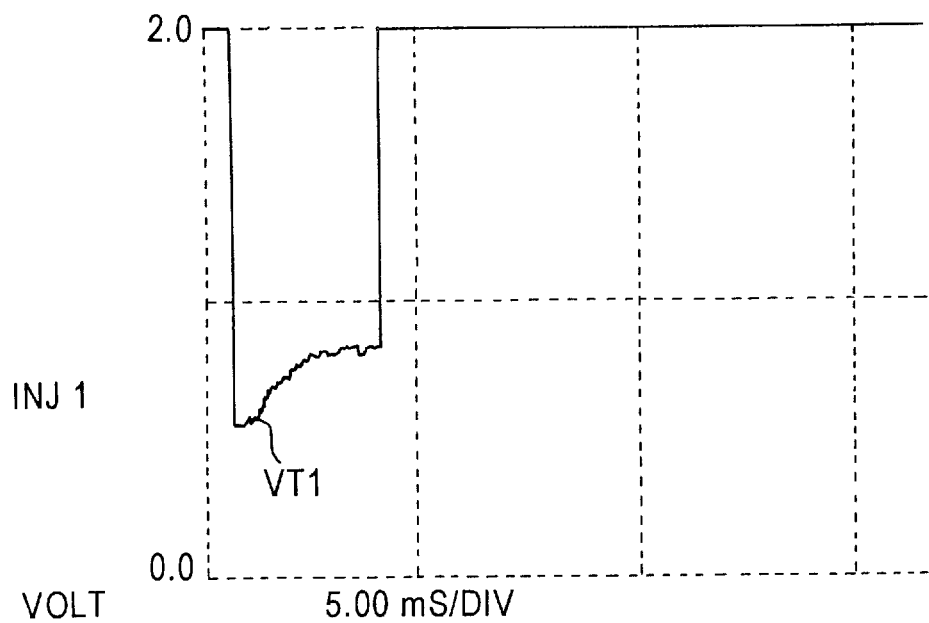
FIGS. 5a–5b show injector voltage waveforms obtained from two injectors, one has normal resistance, while the other has a resistance lower than a normal injector.
Figure 5B:
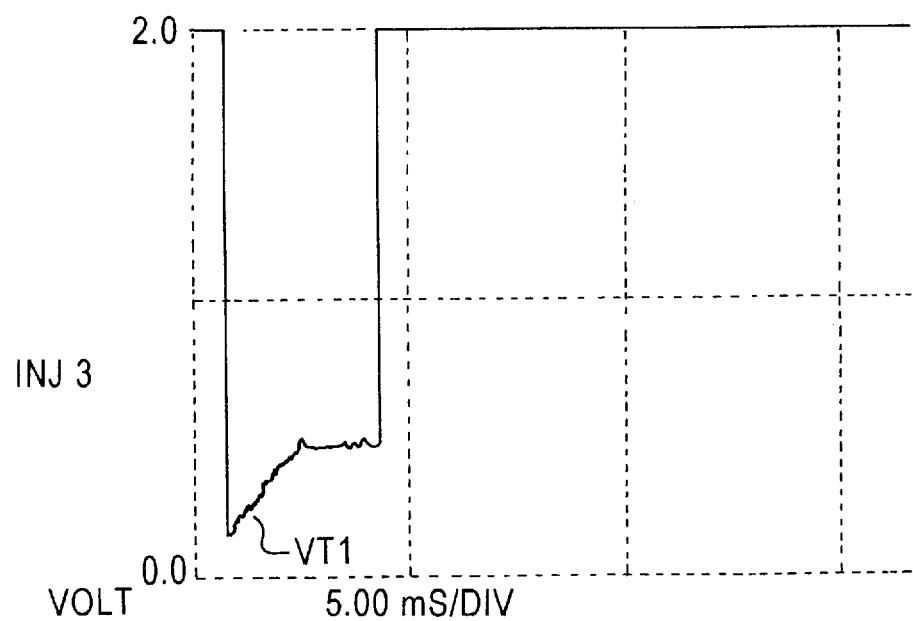

FIGS. 5a shows a voltage waveform of an injector having a resistance lower than normal, and FIG. 5b depicts a voltage waveform of a normal injector. Although the waveform in FIG. 5a appears to have an acceptable $\Delta V$, unlike the normal waveform in FIG. 5b, the waveform in FIG. 5a does not pull the signal all the way to near the ground. Thus, the level of the injector voltage obtained when the injector coil is being energized is an indication of whether the injector has a resistance smaller than that of a normal injector.

As discussed earlier, the tester samples two injector voltages, VT1 and VT2, to calculate $\Delta V$ during a period when the injector coil is being energized. The same sampled voltages can be used to determine whether the injector has a resistance lower than that of a normal injector. In one embodiment, VT1 is used. If VT1 is greater than a predetermined voltage value, then the tester determines that the injector under test has a resistance smaller than that of a normal injector. In one embodiment, the tester indicates that the injector is shorted or nearly shorted. Otherwise, the injector is considered to have a normal resistance.

The predetermined voltage value used to determine the status of the injector may vary from vehicle model to vehicle model, and from injector type to injector type. The predetermined values for different vehicle models or injector types can be determined empirically and stored in the tester. For a typical SFI (Sequential Fuel Injection) injector having a resistance ranging from 10$\Omega$ to 20$\Omega$, the predetermined value may be set at 0.5 volt.

For an exemplary injector having a resistance ranging from 10$\Omega$ to 20$\Omega$, the injector voltages during which the injector coil is being energized may need to satisfy the following equations:

$VT2-VT1=\bullet V$, wherein $\bullet V$ falls between 0.15 volts–0.85 volts $0.0<VT1<0.5$ Volt Although the above example uses only two sample voltages to determine whether an injector has a resistance higher than that of a normal injector, other numbers of sample voltages can also be used to achieve the same result. For example, more than two sample voltages may be measured during the energizing period. Only the largest and smallest voltages are retained, other sampled voltages are discarded. $\Delta V$ is then calculated based on the retained voltages.

Limitations in obtaining injector voltages may also be used. For example, VT1 may be obtained only from the first half of the energizing period, and VT2 may be obtained only from the second half of the energizing period.

In addition to determining whether ΔV falls within a specific voltage range, other determination methods based on injector voltage variations may also be used to evaluate the operational status of an injector. For example, the rate of voltage change during the energizing period may be used and compared with a threshold value or value range. The threshold values or value ranges corresponding to different vehicle models or injector types may be obtained empirically. Other methods based on injector voltage variations may also be adopted without departing from the broader spirit and scope of the disclosure.

Hardware Overview of the Tester

Figure 6:
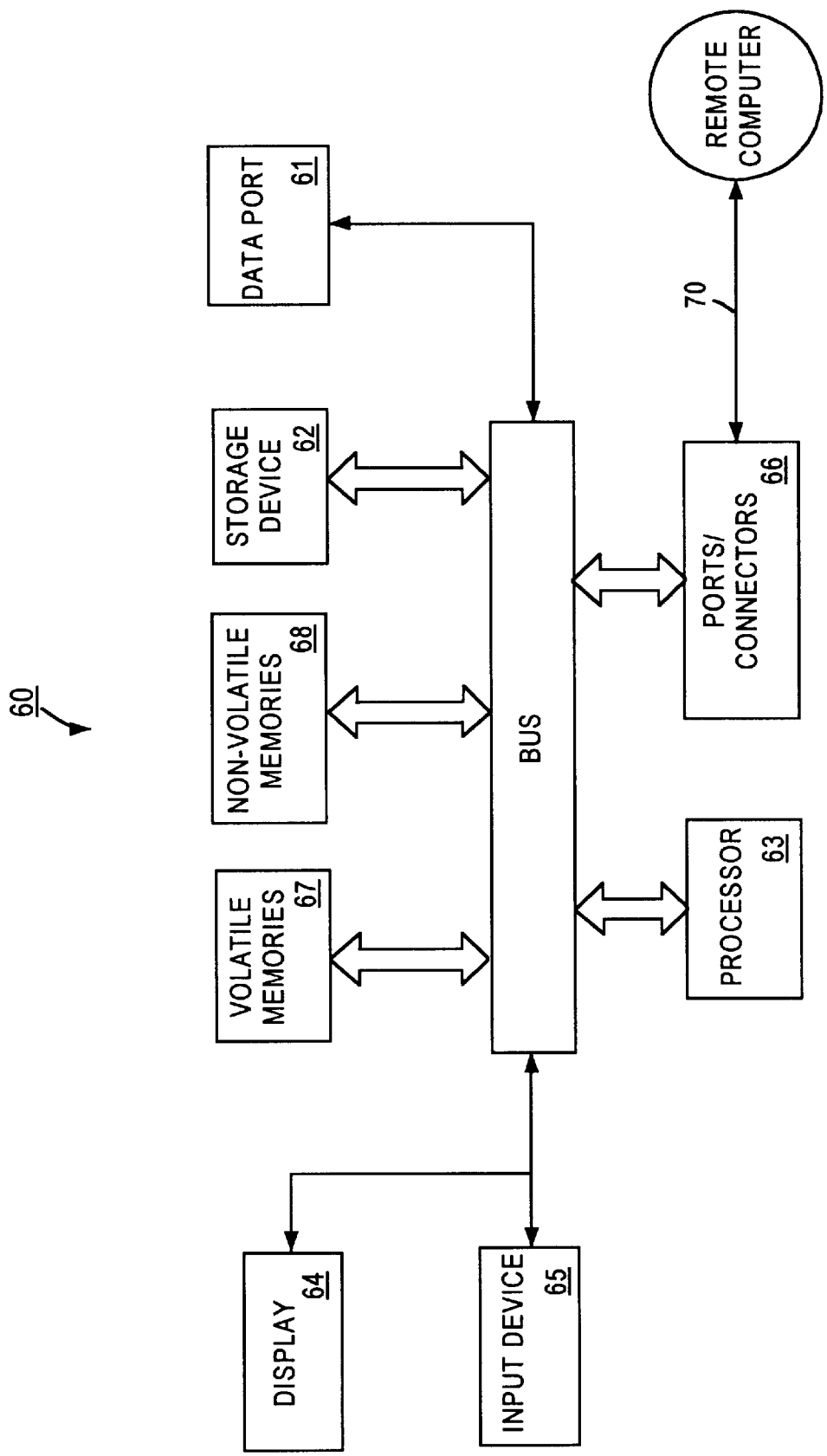
FIG. 6 shows an exemplary tester used to carry out fuel injector diagnoses.

FIG. 6 shows an exemplary tester 60 used to carry out fuel injector diagnoses as described above. The tester may be a stand-alone tester or part of an onboard vehicle computer. The tester 60 includes a data port 61 for receiving signals, a data storage device 62 for storing data and instructions, and a data processing unit 63 coupled to the data port 61 and the data storage device 62. Optionally, the tester may include a display 64, such as a monitor or LCD (Liquid Crystal Display), and an input device 65, such as a keyboard, mouse, push buttons, touch screen panels or voice control devices, for providing a user interface to communicate with an operator of the tester 60. The data processing unit 63 is configured to perform numerous tasks by executing machine-readable instructions, such as processing signals, calculating signal levels, providing a user interface to the operator, displaying instructions and diagnostic results, and receiving commands from the operator, etc.

The data port 61 includes one or more data channels for connecting to sensors, signal probes and/or peripheral devices. Various types of data channels may be implemented, such as USB ports, PS/2 ports, serial ports, parallel ports, IEEE-1394 ports, infra red communication ports, proprietary ports, and/or network connectors 66 for connecting to a remote computer 75 via a data transmission network 70. Signals received from the data port 61 are coupled to the data processing unit 63 and data storage device 62 for storage and/or processing.

The data storage device may include volatile and/or non-volatile memories. Volatile memories 67 include a random access memory (RAM) or other dynamic storage device for storing information and instructions to be executed by the data processing unit. Volatile memories 67 also may be used for storing voltage readings, temporary variables or other intermediate information during execution of instructions to be executed by the data processing unit. Non-volatile memories 68 may include read only memories (ROM), hard disks, CD-ROM, DVD-ROM or other static storage devices for storing static information and instructions. The data storage device 62 may read data and/or instructions from machine readable media (not shown) including, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a data processing system can read.

The tester 60 is controlled in response to the data processing unit 63 executing one or more sequences of one or more instructions contained in the data storage device 62. Such instructions may be read into one type of memory device from another machine-readable medium. Execution of the sequences of instructions causes the tester 60 to perform the process as described herein. In alternative embodiments, hard-wired circuitry may be used in place of or in combination with software instructions to implement the disclosure.

In one embodiment, upon the control of the instructions, the tester 60 receives voltage signals from a signal probe coupled to an injector to obtain signals representing injector voltages. Numerous voltage signals may be sampled and stored in the data storage device. The sampled signals include at least a first injector voltage and a second injector voltage obtained during a period when the voltage source sends currents to the injector coil. The sample signals may include, for example, VT1 and VT2 as shown in FIGS. 4a and 4b. The tester 60 then determines whether the injector has a resistance higher than that of a normal injector based on the voltage difference between VT1 and VT2 (ΔV), as discussed earlier.

The tester 60 may separately determine whether the injector has a resistance lower than that of a normal injector based on an injector voltage obtained during a period during which the voltage source sends current to the injector coil, as discussed earlier. The data processing unit may, for example, compare VT1 with a threshold value stored in the data storage device 62, or obtained from a remote computer 75 connecting to the tester via a data transmission network 70.

Using voltage signals to determine the operational status is more convenient than using current signals because there is no need to hook up a cumbersome current probe either intrusively or non-intrusively. The voltage signals can be obtained with simple voltage access points near the PCM or ECU that controls the injector.

Figure 7:
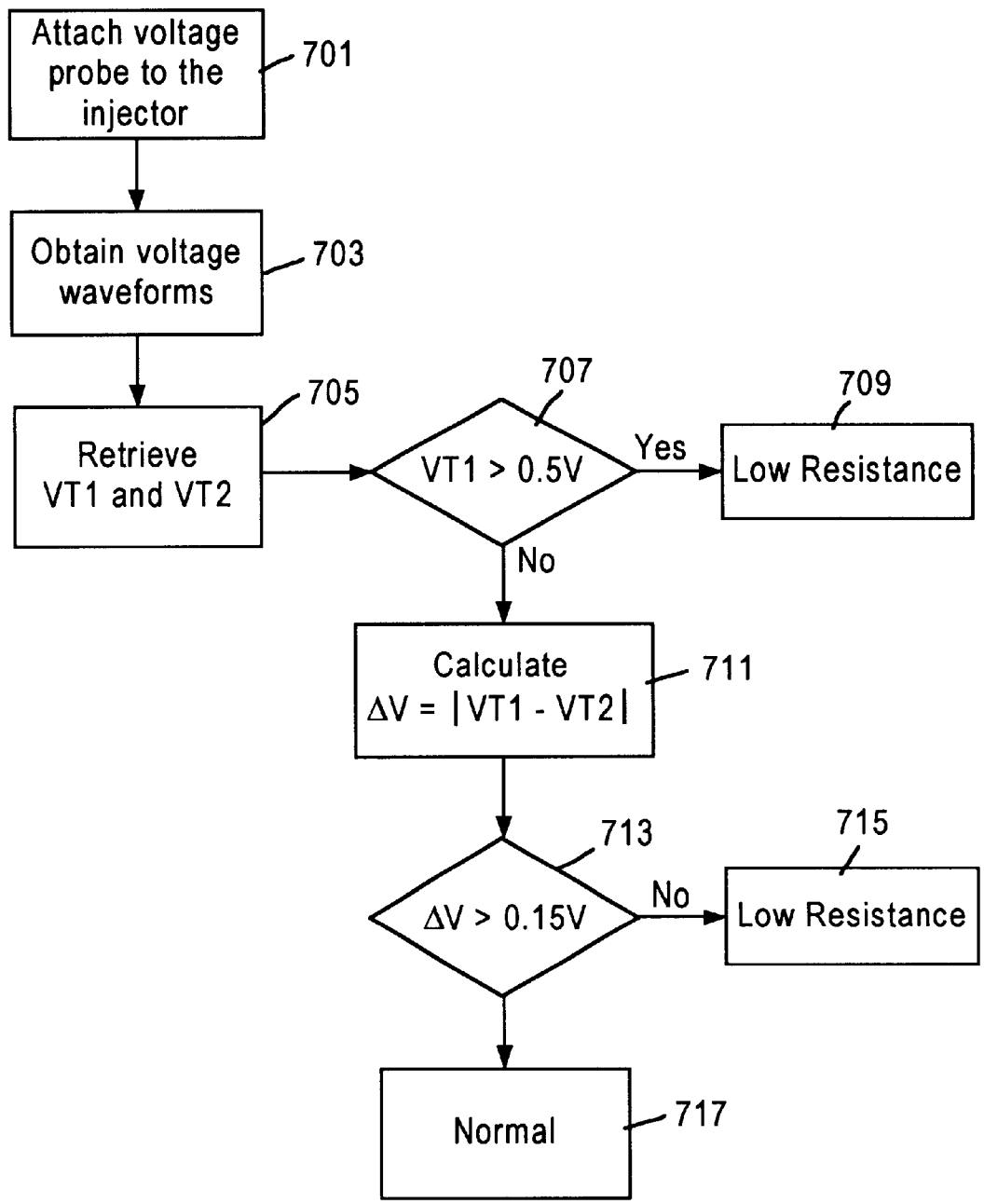
FIG. 7 is a flow chart showing steps of an exemplary diagnosis.

FIG. 7 is a flow chart showing steps of diagnosing an injector coil using an exemplary tester as described above. A user first connects a voltage probe of the tester to point A as shown in FIG. 1 (step 701). The tester obtains injector voltage waveforms during the operation of the vehicle (Step 703). The tester then identifies sample voltage signals VT1 and VT2 (Step 705). The tester then compares VT1 with a first threshold value, such as 0.5 volt (Step 707). If VT1 is larger than the first threshold value, the tester determines that injector coil has a resistance smaller than that of a normal injector (Step 09). Otherwise, the tester continues to calculate the voltage difference ΔV between VT1 and VT2 (Step 711). The tester then compares ΔV with a second threshold value, such as 0.15 volt to determine whether the injector coil has a resistance higher than an acceptable level (step 713). If the ΔV is smaller than the predetermined value, then the tester indicates that the injector coil has a resistance larger than that of a normal injector (step 715). Otherwise, the tester indicates that the injector coil is normal (Step 717).

While the above diagnosis combines the test in determining whether the injector coil has a resistance lower than that of a normal injector, with the test in determining whether the injector has a resistance larger than that of a normal injector, in one embodiment, the two tests can be conducted separately.

Figure 8:
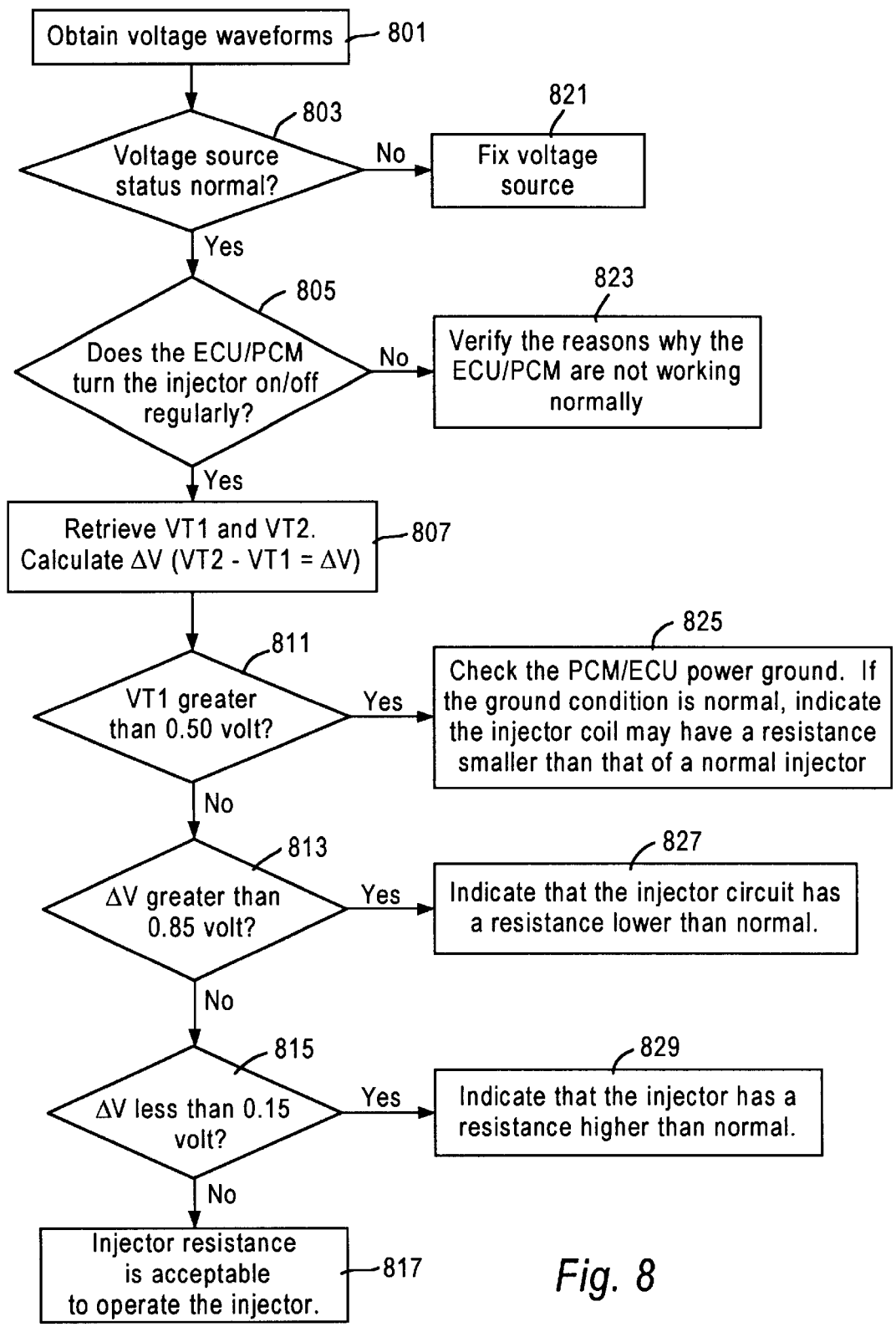
FIG. 8 is a flow chart showing steps of another embodiment in diagnosing an injector coil using an exemplary tester.

FIG. 8 is a flow chart showing steps of another embodiment in diagnosing an injector coil using an exemplary tester as described above. In step 801, the tester obtains injector voltage waveforms. In step 803, the user verifies if there is a normal voltage source. For a vehicle using an injector having a resistance ranging from 10Ω to 20Ω, the voltage source ranges from 13.2 volt to 14.6 volt. If the voltage source is not stable or if the voltage source is not within the normal voltage range, the user needs to check and repair the voltage source, such as fixing open voltage source or open circuit problem, if required (step 821).

If the voltage source is normal, the tester determines if the ECU/PCM energizes the injector by turning the injector on or off regularly (step 805). If not, the tester may alert the user to verify the reasons. There are a number of reasons that the ECU/PCM does not turn on and off the injector even with a normal voltage source. For example, a fault in the anti-theft system, no rpm signal, etc. The most common reasons for a specific injector driver to fail to operate consistently are either a bad ECU/PCM injector driver, or a shorted injector. In some cases, a shorted injector may be the cause of the damaged ECU/PCM injector driver. After the shorted injector and/or its circuit is repaired, many times the PCM/ECU works normally. This is because the PCM/ECU shuts off a specific injector driver to protect each individual transistorized injector driver.

If, in step 805, the tester determines that the ECU/PCM energize the injector properly, the tester retrieves sample voltages VT1 and VT2 and calculates ΔV based on VT1 and VT2 (step 807). In step 811, the tester compares VT1 with a first threshold value, such as 0.5 volt. If VT1 is larger than the first threshold value, the tester alerts the user to check the PCM/ECU power ground. If the ground condition is normal, the injector will indicate that the injector coil has a resistance smaller than that of a normal injector (Step 825). The tester may alert the user to check and replace the injector coil.

If the comparison in step 811 determines that VT1 is smaller than the first threshold value, the tester then compares ΔV with a second threshold value, such as 0.85 volt to determine whether the injector coil has a resistance higher than an acceptable level (step 813). If ΔV is greater than the second threshold value, then the tester indicates that the injector circuit has a low resistance i.e. short or partially shorted injector/circuit (step 827).

If the tester determines that ΔV is smaller than the second threshold value, the tester then determines if ΔV is less than a third threshold value, such as 0.15 volt (step 815). If ΔV is less than the third threshold value, the tester indicates that a high resistance exists in the injector circuit (step 829). The tester may alert the user to check resistance of injector manually. The resistance should not be more than 20 ohm. Otherwise, a replacement of the injector coil is required. The tester may also alter the user to check injector harness connections because many times a high resistance may be caused by corrosion at the injector terminal connections.

If, in step 815, the tester determines that •V is greater than the third threshold value, the tester then determines that the injector has an acceptable resistance (step 817).

In another embodiment, even if an injector is flagged as having a normal or an abnormal resistance, the tester may alert the user to conduct a manual comparative analysis on the injector to determine if the injector has a normal resistance. For example, in the case where that ΔV falls within 20% of the threshold values, the tester generates a message indicating a manual test on the injector's resistance may be necessary. The same technique may also apply to determinations of VT1 or other signals with threshold values.

Although the above example describes evaluating an injector coil disposed in a fuel injector, the application of the method and apparatus is not limited to fuel injectors. Similar approaches can be used to determine an operational status of other coils, such as solenoids or transformers, that has a voltage source sending current intermittently to the coil.

The disclosure has been described with reference to specific embodiments thereof. It will, however, be evident that various modifications and changes may be made thereto without departing from the broader spirit and scope of the disclosure. The specification and drawings are, accordingly, to be regarded in an illustrative rather than a restrictive sense.

What is claimed is:

1. A tester for diagnosing a fuel injector having an injector coil charged by a power source during an energizing period, the tester comprising:
    a data port for receiving signals;
    a data storage device; and
    a data processing unit coupled to the data port and the data storage device;
    wherein the data storage device bears instructions to cause the tester upon execution of the instructions by the data processing unit to perform the machine-implemented steps of:
        accessing a first signal representing a first energizing state of the injector coil during the energizing period;
        accessing a second signal representing a second energizing state of the injector coil during the energizing period; and
        determining a first operational status of the injector based on a level difference between the first signal and the second signal.

2. The tester of claim 1, wherein the instructions further cause the tester upon execution of the instructions by the data processing unit to determine a second operational status of the injector based on levels of at least one of the first signal and the second signal.

3. The tester of claim 1, wherein the first operational status indicates whether the injector coil has a resistance value higher than an acceptable value.

4. The tester of claim 2, wherein the instructions cause the tester upon execution of the instructions by the data processing unit to determine whether the levels are smaller than a predetermined value.

5. The tester of claim 1, wherein the step of determining the first operational status of the injector determines whether the level difference between the first signal and the second signal falls in a predetermined range.

6. The tester of claim 5, wherein the first and second signals represent voltages of the injector coil.

7. The tester of claim 6, wherein the instructions, when executed, causes the tester to indicate that the injector coil has high resistance in response to the level difference between the first energizing state and the second energizing state failing to fall between the predetermined range.

8. The tester of claim 4, wherein the first and second signals represent voltages of the injector coil.

9. The tester of claim 8, wherein the instructions, when executed, causes the tester to indicate that the injector coil is shorted in response to the levels being larger than the predetermined value.

10. A machine-readable medium bearing instructions for controlling the operation of a tester for diagnosing a fuel injector having an injector coil to which current is supplied during an energizing period, the tester comprising a data port configured to receive signals representing energizing states of the injector coil, a data retrieval device for reading data from the machine-readable medium, and a data processing unit coupled to the data port and the data storage device; wherein the instructions, upon execution by the data processing unit, cause the tester to perform the machine-implemented steps of:

accessing a first signal representing a first energizing state of the injector coil during the energizing period;

accessing a second signal representing a second energizing state of the injector coil during the energizing period; and determining a first operational status of the injector based on a level difference between the first signal and the second signal.

11. A tester for diagnosing a fuel injector having an injector coil charged during an energizing period, the tester comprising:

a data port for receiving signals;

a data storage device; and a data processing unit coupled to the data port and the data storage device;

wherein the data storage device bears instructions to cause the tester upon execution of the instructions by the data processing unit to perform the machine-implemented steps of:

accessing a first signal representing a first energizing state of the injector coil during the energizing period;

accessing a second signal representing a second energizing state of the injector coil during the energizing period;

determining whether the fuel injector has a resistance that is lower than acceptable based on the first and second signal levels; and determining whether the fuel injector has a resistance that is larger than acceptable based on a level difference between the first signal and the second signal.

12. A tester for diagnosing a fuel injector having an injector coil charged during an energizing period, the tester comprising:

a data port for receiving signals;

a data storage device; and a data processing unit coupled to the data port and the data storage device;

wherein the data storage device bears instructions to cause the tester upon execution of the instructions by the data processing unit to perform the machine-implemented steps of:

accessing a first signal representing a first injector voltage during the energizing period;

accessing a second signal representing a second injector voltage during the energizing period;

determining whether the fuel injector has a resistance that is lower than acceptable based on levels of at least one of the first and second injector voltages; and determining whether the fuel injector has a resistance that is larger than acceptable based on a level difference between the first injector voltage and the second injector voltage.

13. A tester for diagnosing a coil to which current is supplied intermittently, the tester comprising:

a data port for receiving signals; and a data processing unit coupled to the data port;

wherein the data processing unit is configured to perform the machine-implemented steps of:

accessing a first signal representing a first coil voltage when current is supplied to the coil;

accessing a second signal representing a second coil voltage when current is supplied to the coil; and determining a first operational status of the coil based on a difference between the first coil voltage and the second coil voltage.

14. A tester for diagnosing a coil to which current is supplied intermittently, the tester comprising:

a data port for receiving signals; and a data processing unit coupled to the data port;

wherein the data processing unit is configured to perform the machine-implemented steps of:

accessing a sample signal representing a coil voltage when current is supplied to the coil;

accessing a threshold value; and determining whether the coil has an abnormally low resistance based on the sample signal and the threshold value.

15. A tester for diagnosing a fuel injector having an injector coil to which current is supplied intermittently, the tester comprising:

signal receiving means for receiving signals; and data processing means for processing data received by the signal receiving means;

wherein the data processing means is configured to perform the machine-implemented steps of:

accessing a first signal representing a first injector voltage when current is supplied to the injector coil;

accessing a second signal representing a second injector voltage when current is supplied to the injector coil; and determining whether the fuel injector has an abnormally high resistance based on a difference between the first injector voltage and the second injector voltage.

16. The tester of claim 15, wherein the data processing means is further configured to perform the machine-implemented step of:

determining whether the fuel injector has an abnormally low resistance based on an injector voltage when current is supplied to the injector coil.

17. A tester for diagnosing a coil to which current is supplied intermittently, the tester comprising:

means for receiving signals; and data processing means coupled to the data port;

wherein the data processing means is configured to perform the machine-implemented steps of:

accessing a sample signal representing a coil voltage when current is supplied to the coil;

accessing a threshold value; and determining whether the coil has an abnormally low resistance based on the sample signal and the threshold value.

18. A method for diagnosing a fuel injector having an injector coil to which current is supplied during an energizing period, the method comprising the machine-implemented steps of:

accessing a first signal representing a first energizing state of the injector coil during the energizing period;

accessing a second signal representing a second energizing state of the injector coil during the energizing period; and determining a first operational status of the injector based on a level difference between the first signal and the second signal.

* * * * *